(No Model.)
D. R. FRASER.
FRICTION CLUTCH FOR HOISTING APPARATUS.
No. 250,433. Patented Dec. 6, 1881.
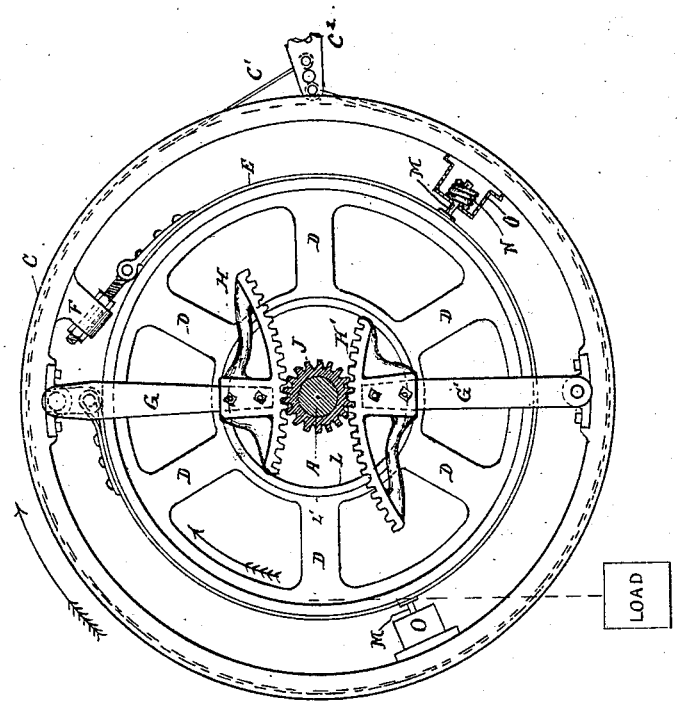
Fig. II.
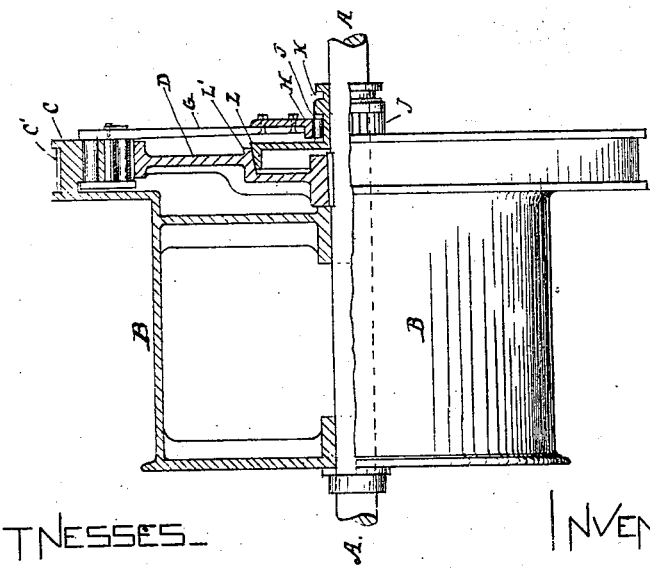
Fig. I.
Witnesses
S. Everett Brown
H. W. Munday
Inventor
David R. Fraser
By Munday Evarts & Adcock
his Atty's.

UNITED STATES PATENT OFFICE.

DAVID R. FRASER, OF CHICAGO, ILLINOIS, ASSIGNOR OF ONE-HALF TO THOMAS CHALMERS, OF SAME PLACE.

FRICTION-CLUTCH FOR HOISTING APPARATUS.

SPECIFICATION forming part of Letters Patent No. 250,433, dated December 6, 1881.

Application filed October 20, 1881. (No model.)

*To all whom it may concern:*

Be it known that I, DAVID R. FRASER, of Chicago, in the county of Cook and State of Illinois, have invented certain new and useful Improvements in Friction-Clutches for Hoisting Apparatus, of which the following is a specification.

My improved clutch is designed more especially for use with hoisting-drums for lifting heavy weights—such, for example, as are commonly employed in mines.

The object of my invention is to provide a means for connecting and disconnecting the loose winding-drum with the revolving shaft on which it is mounted, which shall be operated by the power of the shaft itself, thus securing a firm and secure connection with the expenditure of very little force on the part of the operator, who throws the clutch in and out of gear, all of which will be hereinafter explained.

In the accompanying drawings, which form a part of this specification, Figure 1 is a side view of the apparatus, partly in section; and Fig. 2 is an end view of the same.

Like letters of reference indicate similar parts wherever used.

In the said drawings, A is the driving-shaft. B is the winding-drum, mounted loosely upon said shaft, and C is an extension thereof, of a somewhat larger diameter than the drum itself, constituting a friction-brake wheel, which may be provided with the cone friction-brake band C', operated by the lever C² for checking the movement of the drum.

D is a disk, keyed to the shaft A and revolving therewith. Surrounding the periphery of this disk is the friction-strap E, connected to the drum at F, and at the other end to an operating-lever, G, having its fulcrum upon said drum. The moving end of this lever G is provided with a cog-segment, H, which engages with the pinion J, mounted loosely on the driving-shaft. Connected with this pinion J is the grooved collar K, by means of which it may be moved longitudinally upon the said shaft A through the instrumentality of a suitable lever. (Not shown in the drawings but constructed as clutch-operating handles or levers are usually made.) Upon this pinion, at the other side, is the friction-cone L, fitted to enter the conical recess L' in the disk D, constituting a clutch or frictional engagement between the pinion J and the disk D, brought into action by the movement longitudinally upon the shaft of the pinion.

The operation will be as follows: When the pinion J is moved slightly toward the disk D the frictional surfaces L and L' are brought into engagement, connecting the pinion with moving shaft through the disk D. The pinion now commences to rotate with the shaft, and by the segment H causes the lever G to swing, thus tightening the strap E upon the periphery of the disk D, thereby connecting firmly the drum and the shaft together.

It will be seen that the strength of the connection between the drum and the shaft is by no means limited to the strength of the conical friction-connections L and L', because the power of this connection is multiplied by the lever G, said conical connection being required to be only strong enough to operate the lever. By this means I make the revolving shaft itself do the real work of applying the frictional clutch which connects the drum and the shaft together.

In order to effect a proper balance in the mechanism, I find it sometimes desirable to apply opposite to the lever G and segment H an idle lever and segment, G' and H'. Sometimes, however, the strap E may be connected with good effect to both the lever G and idle-lever G'.

I term, for convenience, the clutch which connects the shaft and pinion together the "primary" clutch, and the clutch which connects the drum and disk together the "secondary" clutch.

It will be seen that the power required to be exercised by the operator in throwing into operation the primary clutch, which connects the pinion with the shaft and disk, is very slight indeed, while the power employed to throw the secondary clutch, which connects the disk with the drum, may be a considerable portion of the power of the shaft itself—in fact, whatever power is necessary. I do not desire to limit myself to the particular kind of primary clutch herein shown, or to the particular kind of secondary clutch shown, although I deem the form shown to be the best. Any well-known form, however, may be substituted in lieu thereof if the combination and the spirit of my invention be retained.

Of course my invention may be applied as a clutching device for pulleys and other mechanical uses as well as for hoisting-drums.

In order to insure a more complete and sudden release of the friction band or strap E from the disk D when the power is removed, I sometimes affix to said strap, at one or more points in its length, rods M, attached to the strap, and which are provided with retracting-springs N, incased in a casing, O, attached to the rim C. The operation is to pull the strap away from the disk throughout its whole length as soon as the strain from the lever G is released, thus more quickly and effectually relieving the friction. The comparatively light resistance of the spring offers no substantial resistance to the tightening of the strap when power is applied for that purpose.

What I claim, and desire to secure by Letters Patent, is—

1. The combination, with the shaft and drum, of the primary clutch and the secondary clutch, the primary clutch operating to bring the secondary into action to unite the drum and shaft, substantially as specified, whereby the power of the shaft itself is brought to bear upon the secondary clutch.

2. The combination of the primary clutch K L L', disk D, pinion J, strap E, lever G, segment or segments H, drum, and shaft, substantially as specified.

3. The combination of the drum, the strap E, the disk D, and lever G, substantially as specified.

4. The combination, with the disk D, rim C, and friction-strap E, of the tightening-lever and the retracting-spring N, substantially as specified.

DAVID R. FRASER.

Witnesses:
N. D. FRASER,
H. M. MUNDAY.